J. R. MITCHELL.
FRICTION DRAFT GEAR.
APPLICATION FILED OCT. 18, 1915.
1,223,820.
Patented Apr. 24, 1917.
3 SHEETS—SHEET 1.
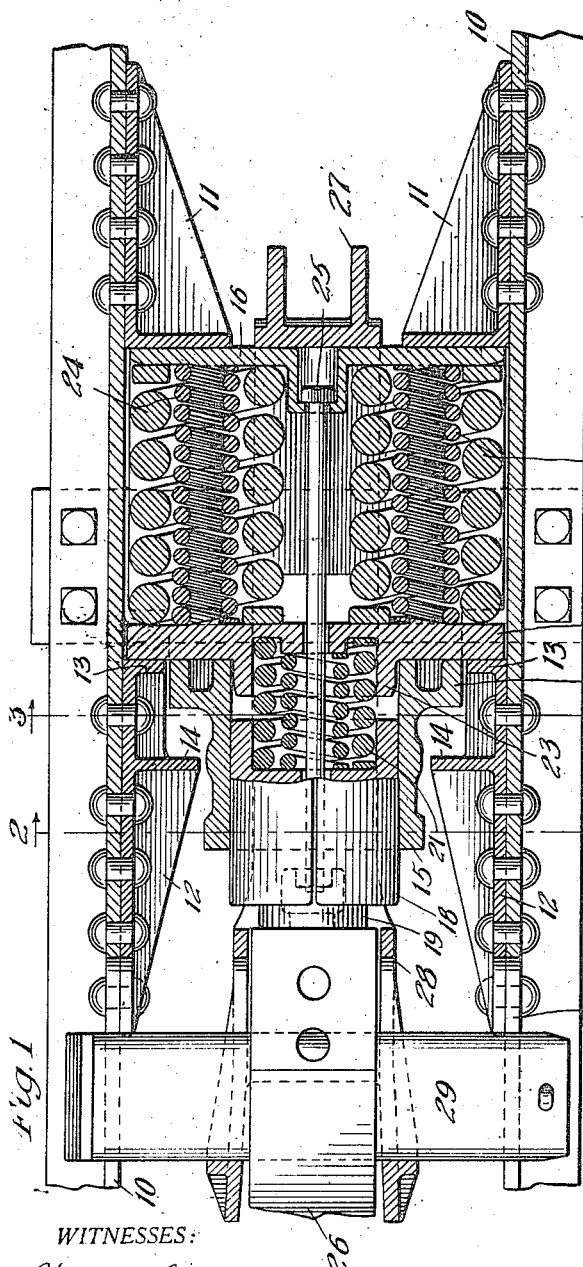
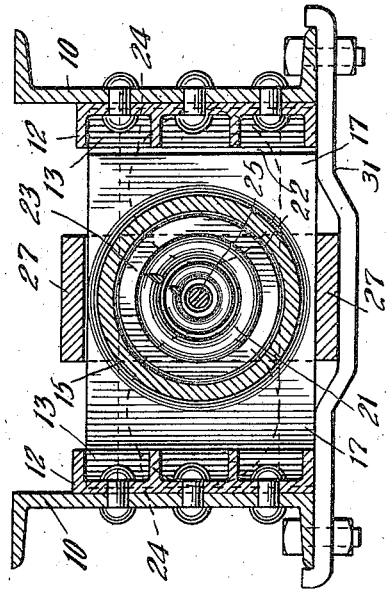
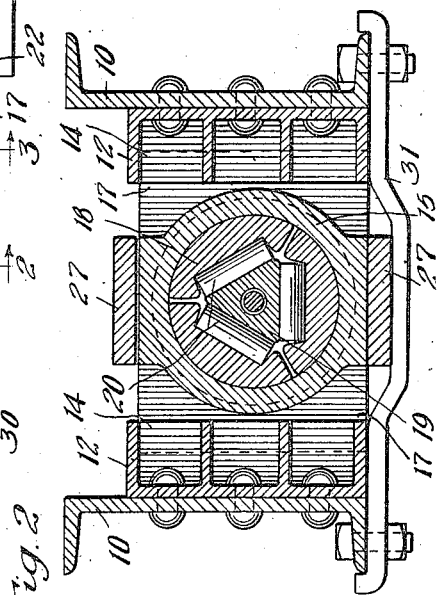
WITNESSES:
Wm. Geiger
INVENTOR.
John R. Mitchell
BY
ATTORNEY

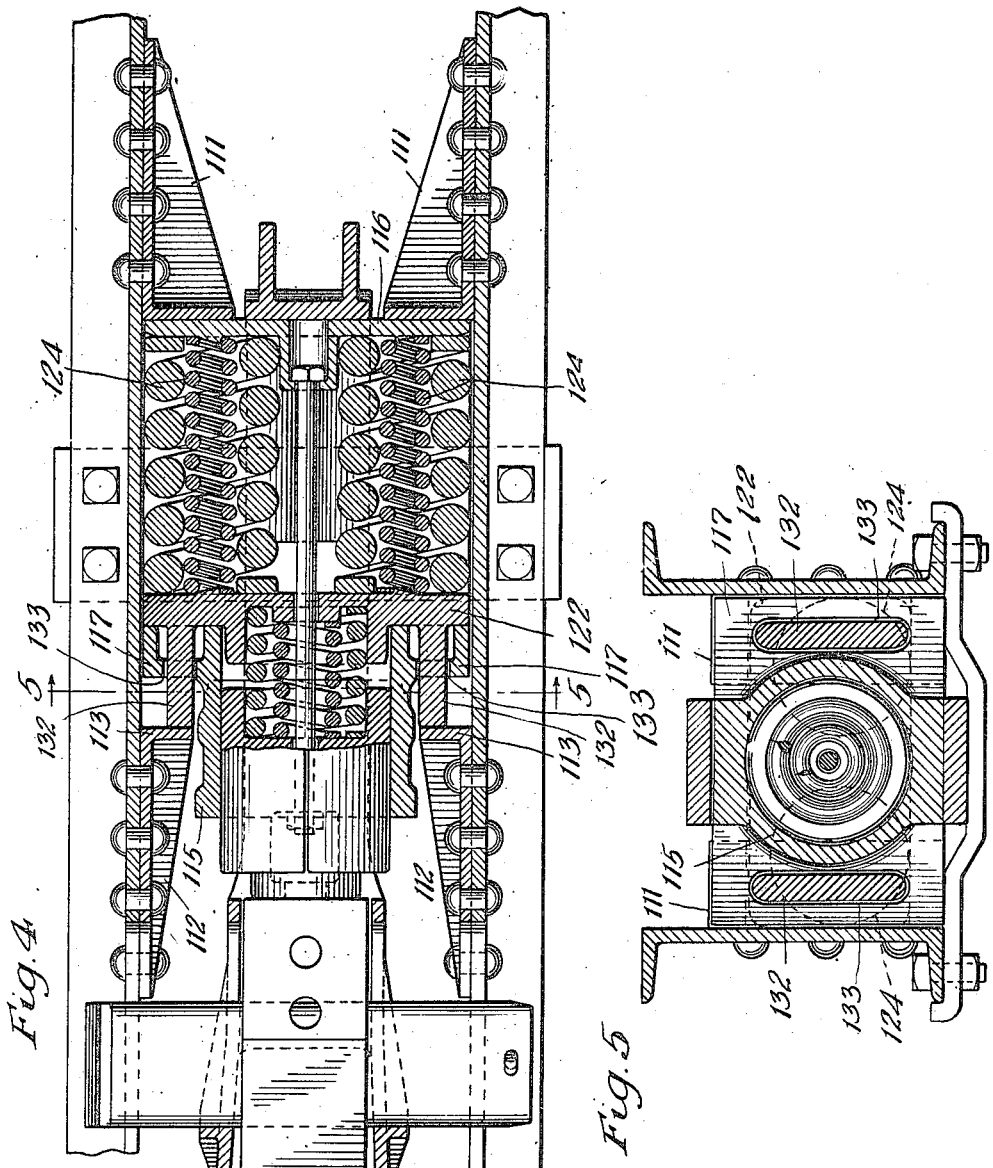

J. R. MITCHELL.
FRICTION DRAFT GEAR.
APPLICATION FILED OCT. 18, 1915.
1,223,820.
Patented Apr. 24, 1917.
3 SHEETS—SHEET 3.
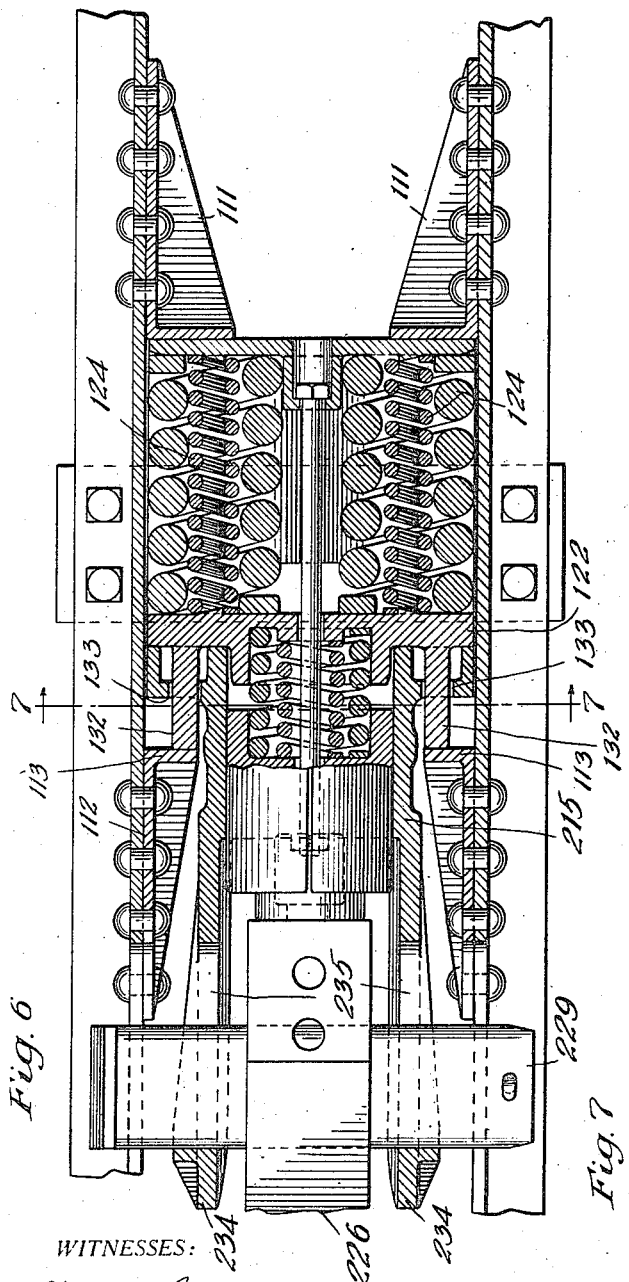
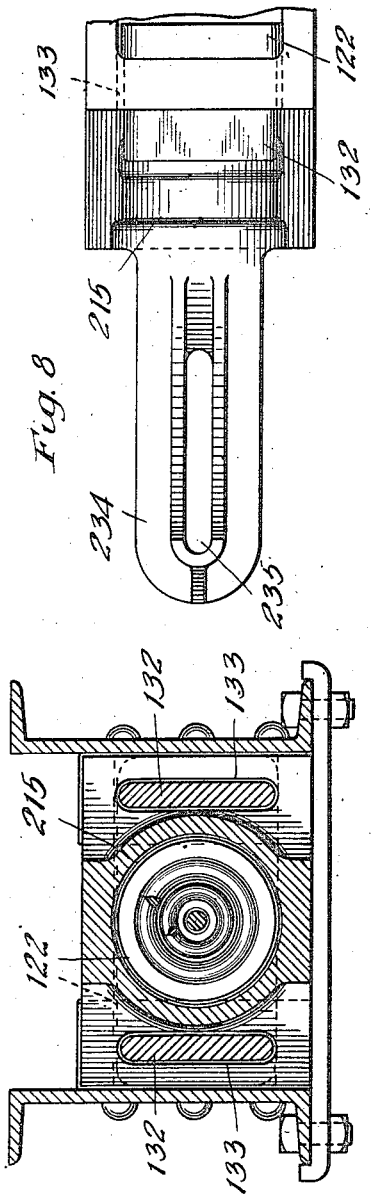
WITNESSES:
Wm. Geiger
INVENTOR.
John R. Mitchell
BY George J. Haight
ATTORNEY

UNITED STATES PATENT OFFICE.

JOHN R. MITCHELL, OF CHICAGO, ILLINOIS, ASSIGNOR TO WILLIAM H. MINER, OF CHAZY, NEW YORK.

FRICTION DRAFT-GEAR.

1,223,820.  Specification of Letters Patent.  Patented Apr. 24, 1917.

Application filed October 18, 1915. Serial No. 56,478.

*To all whom it may concern:*

Be it known that I, JOHN R. MITCHELL, a citizen of the United States, residing at Chicago, in the county of Cook and State of Illinois, have invented a certain new and useful Improvement in Friction Draft-Gears, of which the following is a full, clear, concise, and exact description, reference being had to the accompanying drawings, forming a part of this specification.

This invention relates to improvements in friction draft gears.

One object of the invention is to provide a friction draft gear for railway cars having a high combined spring and friction capacity under buff and a high spring capacity only under draft.

Another and more specific object of the invention is to provide a friction draft gear wherein the friction elements are resisted by twin arranged heavy springs under buff, and the capacity of the gear under draft limited to the capacity of the twin springs.

The invention furthermore consists in improvements in the parts and devices and in the novel combinations of the parts and devices herein shown, described and claimed.

In the drawing forming a part of this specification, Figure 1 is a longitudinal horizontal sectional view of a draft rigging embodying my improvements, Figs. 2 and 3 are transverse vertical sectional views of the structure shown in Fig. 1 and taken on the lines 2—2 and 3—3 thereof, respectively. Fig. 4 is a view similar to Fig. 1, showing another embodiment of my invention. Fig. 5 is a transverse sectional view of the structure shown in Fig. 4 and taken on the line 5—5 thereof. Figs. 6 and 7 are views corresponding respectively to Figs. 4 and 5 of a still further modification of my invention, Fig. 7 being taken substantially on the line 7—7 of Fig. 6. And Fig. 8 is a broken, side elevation of a portion of the friction shell shown in Fig. 6.

Referring to the construction shown in Figs. 1, 2 and 3, 10—10 denote the center or draft sills to which are secured rear stops 11—11 and front stops 12—12, the latter having main stop shoulders 13—13 and limiting stop shoulders 14—14.

The improved gear proper consists of a friction shell 15 having preferably cast integrally therewith a spring case 16, the latter being substantially rectangular and open at the sides to thereby permit the insertion of the follower and springs, as hereinafter described. Where the spring casing unites or coalesces with the friction shell, shoulders 17—17 are formed, the same being normally spaced from the limiting stop shoulders 14 but adapted to engage the latter under draft to thereby limit the compression of the springs. Coöperating with the friction shell 15 are a plurality of friction shoes 18 and wedge 19 and interposed between the wedge and shoes are a plurality of anti-friction rollers 20—20. At the rear of the friction shoes is a preliminary compression spring 21 which, as shown, consists of inner and outer nested coils, said preliminary spring at its inner end being seated against a movable follower 22 which extends through the spring casing and beyond the shoulders 17—17 and normally engages the front stops 13—13. On its forward side the follower 22 is provided with an annular projection 23 which slides within the friction shell and thereby serves to maintain the proper position of the follower 22. Interposed between the follower 22 and the rear wall of the spring casing which acts as the rear follower, are two heavy, twin arranged main springs 24—24, each main spring consisting of an outer heavy coil and an inner smaller nested coil. Extending centrally through the wedge, through the preliminary spring and between the main springs is a retaining bolt 25 which serves to hold the parts in operative position and also to maintain the springs under a preliminary compression. To operatively connect the gear proper with the draw-bar 26, a cast yoke 27 is provided, the same having a hollow rectangular hood 28 at its forward end, the side walls of which are provided with elongated slots to accommodate the rearward movement of the coupler key 29, said key 29 also extending in suitable slots 30 formed in the draft members and front stops 12. A saddle plate 31 is bolted to the draft members and assists in sustaining the weight of the gear. The operation is as follows. Upon buff or rearward movement of the draw-bar, the combined friction shell and spring casing is prevented from rearward movement by the engagement thereof with the rear stop 11—11. The wedge and friction shoes are forced inwardly relatively to the friction shell and the first resistance offered is that of the preliminary spring 21. After the shoes have been moved inwardly sufficiently to engage the extension 23 of the follower 22 further movement of the friction shoes is resisted by the main springs 24—24. In this way the resistance under buff is graduated and reaches a high ultimate capacity, due to the twin arrangement of heavy springs 24. Under draft, the follower 22 remains stationary and the combined friction shell and spring casing is pulled forwardly, thereby compressing the springs 24—24 between the rear wall of the spring casing and the follower 22. The buffing action is limited by the engagement of the shoulders 17—17 with the limiting stops 14—14. As will be apparent, under draft there is no relative movement between the friction shoes and the friction shell so that the entire pull is absorbed by spring action only. However, the spring capacity is relatively high due to the twin arrangement of the springs.

Referring to the construction shown in Figs. 4 and 5, 111—111 denote the rear stops and 112—112 the front stops, the latter having only one set of stop shoulders 113—113. In this construction the friction shell 115 is also preferably formed integrally with the spring casing 116, with the resultant shoulders 117—117 where the casing and friction shell unite. Twin arranged main springs 124—124 are also provided and a front movable follower 122, the latter, however, instead of extending at the sides beyond the shoulders 117 and engaging separate stops, is provided with forwardly extended lugs 132 which pass through correspondingly shaped perforations or openings 133 formed in the shoulders 117. The lugs 132 normally engage the stops 113. The friction elements, preliminary spring, draw-bar, yoke and connection between the yoke and draw-bar are shown as similar to the corresponding parts illustrated in Figs. 1, 2 and 3.

The operation of the device illustrated in Figs. 4 and 5 is as follows: Upon buffing movement, the combined friction shell and spring casing remains stationary and the friction elements, preliminary spring, front follower 122 and main spring 124 are actuated in the manner heretofore described for the structure illustrated in Figs. 1, 2 and 3. Upon draft the follower 122 is held stationary on account of the engagement of the lugs 132 with the stops 113 and the springs 124 are compressed as the combined friction shell and spring casing is moved forwardly. It will again be observed that no frictional action occurs between the shoes and friction shell upon forward or draft movement. The movement of the parts under draft is limited by the engagement of the shoulders 117 with the stops 113.

Referring now to the construction illustrated in Figs. 6, 7 and 8, the arrangement of front and rear stops, friction shell, spring casing, front follower with its projections engaging the front stops, main springs, friction elements and preliminary springs are substantially the same as the corresponding parts illustrated in Figs. 4 and 5, and a detailed description of the same is not thought necessary. In the arrangement shown in Figs. 6, 7 and 8, instead of employing a yoke, the friction shell 215 is provided with integral, forwardly extended side arms 234, each of which has an elongated slot 235 to accommodate the inward movement of the coupler key 229 that also passes through the draw-bar 226. The action of the device shown in Figs. 6, 7 and 8 is substantially the same as that of the device illustrated in Figs. 4 and 5, except that upon draft or forward movement of the draw-bar the friction shell and spring casing is pulled forwardly by the integral arms 234 instead of by a yoke.

Although I have herein shown and described what I now consider the preferred manner of carrying out my invention, I do not wish to be limited to the exact constructions shown and described but contemplate all changes and modifications as come within the scope of the claims appended hereto.

I claim:

1. In a draft rigging, the combination with stop members, of a longitudinally movable combined friction shell and spring casing, friction elements coöperable with said shell, springs within said casing, and a follower interposed between the friction elements and said springs, said follower being movable with the friction elements when pressure is applied to the latter to operate the gear in one direction, said follower remaining stationary and said shell and casing moving when the gear is operated in the opposite direction.

2. In a draft rigging, the combination with a longitudinally movable friction shell, spring casing, friction elements coöperating with said shell, and spring within said casing, of a follower interposed between said friction elements and said spring, front and rear stops, said follower engaging one set of stops when the friction shell and spring casing is moved in one direction, the spring casing engaging the other sets of stops when the gear is operated in the opposite direction.

3. As an article of manufacture, a combined friction shell and spring casing, the latter being wider than the shell and thereby forming transversely extending shoulders where the shell and casing coalesce, said shoulders being provided with openings through which are adapted to extend projections from a follower within the spring casing.

4. As an article of manufacture, a friction shell having a spring casing formed integrally therewith at the inner end of the shell, said shell having also formed integrally therewith at its opposite end arms each of which is provided with an elongated slot adapted to receive a coupler key.

5. In a device of the character described, the combination with a longitudinally movable friction shell, spring casing, friction elements coöperating with said shell, and twin arranged springs within said casing, of a follower within the casing and located between said springs and the inner ends of said friction elements, and means for holding said follower stationary while the shell moves when the gear is actuated in one direction, whereby the combined capacity of the twin springs and friction elements is obtained when the gear is actuated in one direction, and only the capacity of the twin springs is obtained when the gear is operated in the opposite direction.

6. In a device of the character described, the combination with draft members, having front and rear sets of stops, of a combined friction shell and spring casing, the rear wall of the latter serving as the rear follower to engage the rear set of stops, said shell and casing being provided with laterally extending shoulders where the casing unites with the shell, of a follower extending transversely of the spring casing, twin arranged springs interposed between said follower and the rear wall of the spring casing, friction elements coöperable with said shell and located forwardly of said follower, said follower remaining stationary under draft, the friction shell and spring casing being movable relatively thereto, the forward movement of said shell and casing being limited by the engagement of said shoulders with stops.

In witness that I claim the foregoing I have hereunto subscribed my name this 4th day of October, 1915.

JOHN R. MITCHELL.